Figure 1:
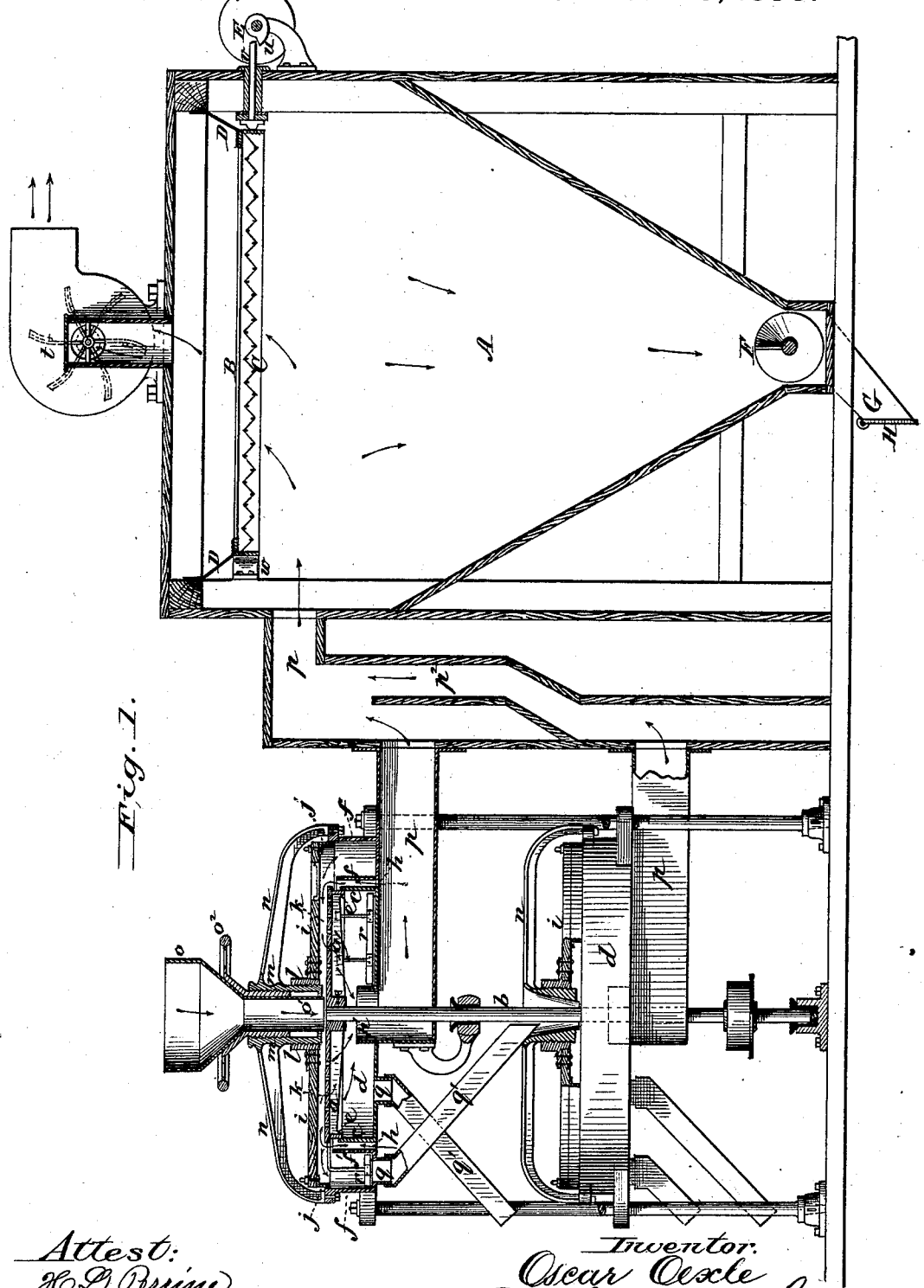

2 Sheets—Sheet 1.

O. OEXLE.
Apparatus for Purifying Grain, &c.

No. 225,859. Patented Mar. 23, 1880.

Attest:
H. D. Brine
Floyd Norris

Inventor.
Oscar Oexle
By Johnson & Johnson
Atty's

O. OEXLE.
Apparatus for Purifying Grain, &c.
No. 225,859. Patented Mar. 23, 1880.
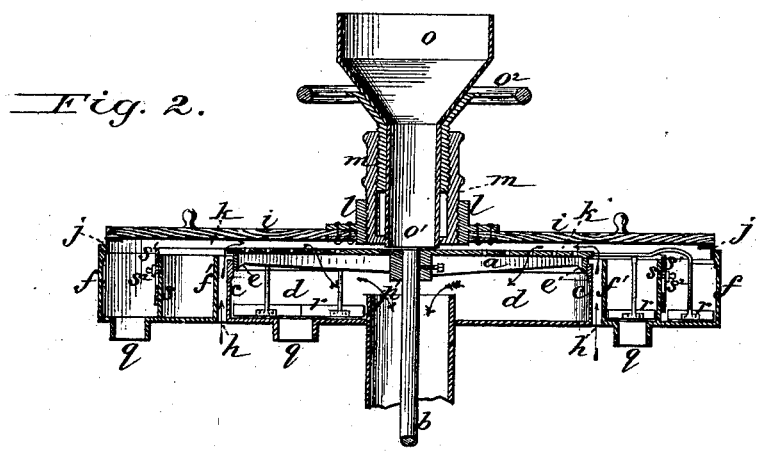
Fig. 2.
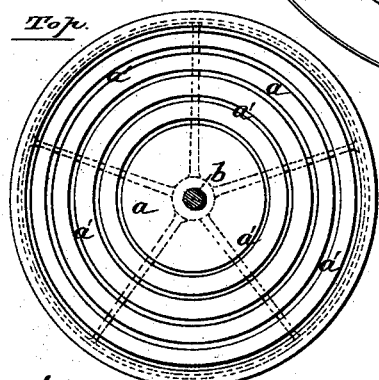
Fig. 4. Top.
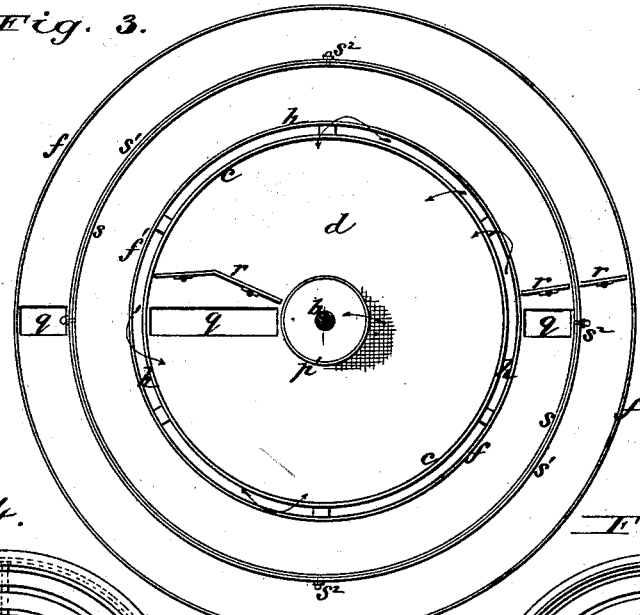
Fig. 3.
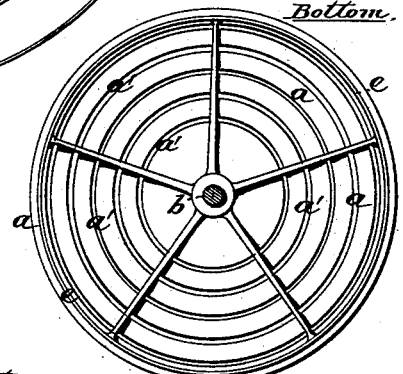
Fig. 5. Bottom.
Attest:
H. L. Perrie
Floyd Norris
Inventor:
Oscar Oexle
By Johnson & Johnson
Atty's

UNITED STATES PATENT OFFICE.

OSCAR OEXLE, OF AUGSBURG, BAVARIA, GERMANY.

APPARATUS FOR PURIFYING GRAIN, &c.

SPECIFICATION forming part of Letters Patent No. 225,859, dated March 23, 1880.

Application filed November 6, 1879.

*To all whom it may concern:*

Be it known that I, OSCAR OEXLE, of Augsburg, Kingdom of Bavaria, in the German Empire, have invented certain new and useful Improvements in Apparatus for Purifying Grain, Middlings, &c., and collecting the dust therefrom; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is for purifying grain and all ground products thereof, and collecting and separating the flour-dust in mills from the suction air-currents.

My invention and apparatus are equally applicable for purifying grain, semolino, middlings, broken wheat, and heavy bran, and for freeing and collecting the dust from the air in the purifying process.

My purifying apparatus embraces a revolving perforated or skeletonized disk, adapted for operation within an exhausting-compartment beneath and between it, and an adjustable imperforate cover, which forms a receiving-chamber for the material above the rotating skeletonized disk. An annular receiving-case surrounds the exhausting-compartment in which the skeletonized disk revolves, and communicates with the receiving-chamber. An annular space is formed at the circumference of the exhausting-compartment and between it and the receiving-case, through which air enters the top receiving-chamber from below. A hopper pierces the adjustable cover centrally with the aspirating and skeletonized disk, and is vertically adjustable in relation to the surface thereof. The exhausting-chamber of the skeletonized rotating disk communicates by a suction-conduit with a dust-collecting chamber or room provided with an air-filter, above which is arranged an exhausting-fan, the action of which causes the air to enter the space at the circumference of the aspirating skeletonized disk, and the granules being forced outward by the centrifugal action thereof are caused to pass through the air in opposite direction to and against the incoming currents, whereby the heaviest and best particles are collected in the receiving-case, while the air-currents are aspirated by the exhauster through the perforations or openings in the disk, and carry along with them the light fuzzy bran-particles, as well as the low-grade middlings, into the exhausting or inner chamber, within which the aspirating-disk revolves by an air-tight joint, and the light fuzz and dust are drawn into the suction-conduit, thence into the dust-chamber, where they are filtered and exhausted free and clear by the action of an air-filter interposed between the rotating aspirating or separating disk and the exhausting-fan. The force of the air-currents produced by the exhausting-fan is regulated by raising and lowering the cover which forms the top of the receiving-chamber, thereby governing the distance of said cover from the disk and the area of said chamber. The bottom of the exhausting-chamber and of the receiving-case are provided with openings, and scrapers are adapted to be revolved by the disk over such openings and within such compartments to clear them of the purified granules or middlings which are conducted into suitable receptacles. The feed upon the disk is regulated by raising or lowering the hopper. The air-filter is of some suitable cloth, fitted in a shaking frame tightly closed all around the sides of the dust-chamber, so that no air can escape through the exhauster without having first passed through the movable screen or filter, thereby returning the purified air to the outside of the machine and within the mill. All the light fuzzy impurities and fine flour coming from the purifying apparatus are collected in the bottom of the dust-chamber, from which they are carried by a suitable conveyer, the outlet of which is properly tightened, so that no air can enter into the dust-chamber at that point, but the whole suction must be direct from the receiving top chamber through the skeletonized disk.

I may employ one, two, or more aspirating rotating disks on one spindle, each working with a tight joint in an exhausting-chamber, and in connection with the same exhaust and in combination with any mechanism for intercepting the light impurities and fine flour carried off by the air-currents.

My invention contemplates, broadly, the combination, with a middlings purifier or separator and a fan or fans for producing a suction through the same, of means for intercepting the light impurities and fine flour carried off by the air-currents and returning the purified air to the outside of the machine, the object whereof is to keep the air in the mill free from combustible particles and to save the loss of material carried off in dust by the exhaust, thus avoiding cause of fire and keeping the air in the mill free from danger of explosion, and the mill is rendered warmer and healthier.

Referring to the drawings, Figure 1 represents a vertical section of a middlings purifier or separator and an air-filter embracing my invention; Fig. 2, a sectional view of the aspirating or separating device; Fig. 3, a plan view of the central exhaust-chamber, within which the skeletonized disk revolves with close joinings, and of the receiving case or cylinder, showing also the intervening air-space; Fig. 4, a top view of the rotating skeletonized aspirating-disk, and Fig. 5 a bottom view of the same. These detail views are shown upon an enlarged scale.

The purifying device consists of a perforated or skeletonized disk, $a$, suitably mounted upon a vertical shaft, $b$, and adapted to be revolved thereby within and from the top of a cylinder, $c$, which forms an exhausting-chamber, $d$, the joining of said disk with the cylinder being made as nearly air-tight as possible by means of a rim, $e$, projecting from the under side of said disk and telescoping with the top edge of the cylinder $c$, such joining, however, being so made as to allow the disk to be freely revolved with its joint-rim $e$ either within or upon the outer side of the cylinder. This exhausting-chamber $d$ forms part of a fixed surrounding receiving-case, $f$, between the inner wall, $f'$, of which and the central cylinder, $c$, is left a concentric air-passage, $h$, opening at the bottom into the mill, while the disk partially extends over its top. This surrounding-case is open at the top, and its bottom forms also the bottom of the exhausting-chamber, while its inner wall, $f'$, is not as high as the disk. It is inclosed by an imperforate adjustable top disk or cover, $i$, the circumference of which is provided with a rim or curb, $j$, which fits, with a close telescoping joining the outside wall of the surrounding cylinder $f$, and forms a receiving-chamber, $k$, above the skeletonized disk. The area of said chamber is regulated by raising or lowering said cover $i$, which, for this purpose, is mounted by an interior screw-sleeve, $l$, upon a central screw-threaded sleeve, $m$, depending from a spider-frame, $n$, supported upon the receiving outer case, $f$, and within which latter sleeve $m$ the hopper $o$ is supported and made adjustable by internal screw-connections in a manner to regulate the distance of the lower end of the hopper-tube $o'$ from the surface of the disk. This vertical adjustment of the hopper-tube is effected by turning the hand-wheel $o^2$, while the vertical adjustment of the cover $i$ is made by turning it to the right or left by hand-knobs or otherwise. The spider-frame $n$ therefore carries both the adjustable hopper and the adjustable cover for the disk and for the receiving-case. A suction-conduit, $p$, opens into the bottom of the exhausting-chamber $d$ by an inward-projecting collar, $p'$, and this conduit is in communication with a suitably-located suction-fan or other exhausting device.

The rotating disk may be formed with concentric openings $a'$, as shown, in which case the rings are united by a spider, Fig. 5, or it may be perforated by circular or other shaped openings that will give a skeletonized surface, and it may be of any suitable material, such as cast-iron, sheet metal, wood, silk, gauze, (bolting-cloth,) or wire webbing of any kind, so long as it serves to form a spreading surface under its centrifugal force, and an aspirator to the material being delivered centrally upon said disk, and regulated by the vertical adjustment of the hopper, according to the character of the material, while the proximity of the adjustable cover $i$ to the disk is regulated according to the specific weight of the substance to be purified, and according to the strength of the air-currents, which is lessened by raising the cover and increased by lowering it.

The revolutions of the disk may be from eighty to two hundred per minute and more, forcing the material over its surface in a thin sheet, the better and heavier particles being collected in the outer case, $f$, while the air-currents drawn by the exhauster into the top receiving-chamber, $k$, through the annular space $h$ pass over the disk $a$ toward its center, and through the material and through the disk-openings $a'$, carrying the dust and light impurities into the exhausting-chamber $d$, and into and through the suction-conduit $p$ into a dust-collecting chamber, leaving the low-grade middlings in the exhaust-chamber $d$, to effect which the connection of the suction-conduit with said chamber rises a suitable distance above its bottom, as shown in Figs. 1 and 2, so as to form an interior guard or curb, $p'$, to the dust-exit openings. The central and outer chambers of the fixed case are provided with suitable bottom openings, $q$, from which spouts $q'$ conduct the different grades of the purified material into separate receptacles, the discharge of such material from said collecting-chambers being effected by means of scrapers $r$, carried by arms from the disk $a$, and revolved by it in contact with the bottom of said chambers and over the openings, as shown in Figs. 1, 2, and 3.

The outer receiving-chamber may be divided into sub-compartments by a cylinder, $s$, Figs. 2 and 3, to which an adjustable band or curb, $s'$, is secured by set-screws $s^2$, so that it may be set a little above the top of the rotating disk for the purpose of cutting off a part of the purified middlings, and to keep them separate, and in this way discharge from a rotating skeletonized disk distinct grades of purified middlings for collection into separate receivers, and obtain thereby a more perfect purification with increased capacity in a small space.

The suction through the aspirating-disk is produced by an exhausting fan or fans, t, connected with the suction-conduit p in any suitable way. I prefer to make this connection between the suction-conduit and the exhausting-fan by means of a dust-collecting chamber or room, A, in the upper part of which, and above the entrance of the suction-conduit into said chamber, is arranged horizontally an air-filter which is practically dust-tight, consisting of a shaking frame, B, suitably covered or provided with filtering-cloth C, of any suitable material that will allow an air-suction through, but exclude dust, such as woolen, cotton, or hairy cloth, so disposed as to give the largest surface. This frame is suspended in position by similar fabric D, secured all around the frame and to the inner sides of the chamber, so that the air can pass out through the exhauster only by first being drawn through the filtering-diaphragm, leaving the dust and fine flour and fuzzy particles carried in the air from the purifying apparatus adhering to the under side of the filter, and which are cleared therefrom as fast as they accumulate by the shaking movement given to the frame by an outside tappet-shaft, E, revolved by a belt or otherwise, so that the tappet u, acting upon a push or knocker rod, v, will throw the filtering-frame to one side, and a counteracting-spring, w, will throw said frame in the opposite direction, as shown in Fig. 1, causing the collected particles to fall to the bottom of the chamber, such descent being aided by reason of having the suction-conduit enter near the top of the chamber and just below the filtering-diaphragm. The bottom of this chamber is hoppered, and a conveyer, F, is arranged therein, so as to carry the deposit into an outlet, G, which is sealed with a hanging valve, H, that opens to let out the stuff from the inclined outlet, but which will prevent the air entering at the conveyer-opening.

The connection between the purifier and the dust-collecting chamber may be made as shown or in any other suitable manner, said chamber being made as nearly air-tight as possible, so as to obtain the full effect of the suction through the rotating disk.

When two or more purifiers are arranged for operation upon a single shaft the suction-conduit of each will communicate with the dust collecting and filtering chamber at the same point by means of the branch conduit $p^2$, and in such arrangement certain grades of the purified material are discharged from the upper into the lower purifiers to effect, by successive operations, the complete purification.

I may use the dust-chamber in combination with any kind of middlings-separator; but in such connection the filtering-diaphragm must intervene between the communication with such separator and the exhaust device; or I may use my new separator, discharging the dust outside the mill, while the dust-filter may be used in connection with grinding-mills or in connection with a mill-apartment only.

The mechanism constituting the separator or purifier is supported upon suitable framework, and the shaft is driven by a pulley. The cover or top i may be provided with windows through which to observe the interior of the case.

I do not confine myself to the specific design herein shown and described, as many details in the device may be varied in both construction and arrangement.

I claim—

1. In a purifier or separator for middlings and the like, the combination, with an inclosed feed-receiving chamber, having an air-supplying duct opening therein from the outside, and an exhausting device, of a horizontal rotating skeletonized or perforated disk interposed between said feed-receiving chamber and the exhauster, and through which the suction of the dust and low-grade stuff is effected by means of the air-currents from said exhauster and the centrifugal action of said disk upon the material fed thereon, substantially as herein set forth.

2. In a purifier or separator for middlings and the like, the combination, with an inclosed chamber into which the material is fed, and having an air-supplying duct opening therein from the outside, of a horizontal rotating skeletonized or perforated disk and an exhausting-chamber communicating with said top chamber through the openings in said disk and with an exhauster by a suction-conduit from the bottom of said exhausting-chamber, whereby, under the centrifugal action of said disk, the dust, fuzz, and low-grade middlings are aspirated through the disk into said exhausting-chamber, and from which the dust and lightest fuzz are drawn through the suction-conduit, substantially as herein set forth.

3. In a purifier or separator for middlings and the like, the combination, with an inclosed chamber into which the material is fed, having an air-supply duct opening therein from the outside, a horizontal rotating skeletonized or perforated disk, and an exhausting-chamber covered by said disk, of a surrounding compartment or compartments communicating with said top chamber, and in which, under the centrifugal and aspirating action of said disk, the granules and purified material are deposited, substantially as herein set forth.

4. In a purifier or separator for middlings and the like, the combination, with an inclosed chamber into which the material is fed, a horizontal rotating skeletonized or perforated disk, an exhausting-chamber covered thereby, and one or more surrounding compartments communicating with said top chamber, of an annular air-duct formed by and between the cylinders of the central and surrounding compartments and communicating with said top chamber at the circumference of said disk, and through which the air-supply to the aspirating-disk is effected, substantially as herein set forth.

5. In a purifier or separator for middlings and the like, the combination, with a horizontal rotating skeletonized or perforated disk, an exhausting-chamber covered thereby, one or more surrounding compartments, and an air-supplying duct at the circumference of said disk, of an adjustable cover or top, forming the receiving-chamber for the fed material and a close joining with the surrounding compartment and a cover for said air-supplying duct, whereby the force of the air-currents over the aspirating-disk is regulated by adjusting said top or cover nearer to or farther from said disk, substantially as and for the purpose herein set forth.

6. In a purifier or separator for middlings and the like, the combination, with a horizontal rotating skeletonized or perforated disk, an exhausting-chamber covered thereby, one or more surrounding compartments, an air-supplying duct at the circumference of said disk, and an adjustable cover or top forming a receiving-chamber for the fed material, and a close joining with the compartment-case, of a vertically-adjustable hopper centrally piercing said adjustable cover, whereby the feed is regulated, in connection with the adjustment of the compartment-case cover, under the conditions stated.

7. In a purifier or separator for middlings and the like, the combination, with an inclosed feed-receiving chamber communicating with one or more case-compartments, a horizontal rotating skeletonized or perforated disk, an exhausting-chamber covered by said disk, surrounded by an air-supplying duct, and communicating with an exhauster, of scrapers carried by said disk over openings in said compartment and exhausting-chambers, whereby the purified and the low-grade middlings are discharged therefrom into separate receivers, substantially as herein set forth.

8. In a purifier or separator for middlings and the like, the combination, with an inclosed feed-receiving chamber, a compartment-case, $f f'$, with which it communicates, a horizontal rotating skeletonized or perforated disk, an exhausting-chamber covered thereby, surrounded by said compartment-case, and communicating with an exhauster, and an air-supplying duct surrounding the circumference of said disk, of a vertically-adjustable cylinder or curb arranged within said compartment-case in the relation to said disk and to form sub-compartments for different grades of purified middlings, substantially as and for the purpose herein set forth.

9. In a purifier or separator for middlings and the like, a horizontal rotating skeletonized or perforated disk, $a$, upon which the feed is received, provided with an under rim, $e$, adapted to fit and revolve with an air-tight joining, the cylinder $c$, which forms an exhaust-chamber, said disk being above the cylinder $f'$, which forms the inner wall of a compartment-case surrounding said exhaust-chamber and forming the intervening air-supply duct opening above said disk, substantially as and for the purpose herein set forth.

10. The exhausting-chamber $d$, covered by a horizontal rotating skeletonized or perforated disk, $a$, in combination with a suction-conduit, $p$, piercing the center of said chamber and extending above its bottom by the collar or curb $p'$, whereby to form an exit for the dust and light fuzz aspirated through the openings in said disk, and to retain the low-grade middlings drawn through said disk within said chamber, substantially as herein set forth.

In testimony that I claim the foregoing I have hereunto set my hand.

OSCAR OEXLE.

Witnesses:
PHILIPP TAFELIN,
PAUL STETTER.